Sept. 21, 1937.  H. LINDNER  2,093,917
DIVIDING APPARATUS FOR MACHINE TOOLS
Filed Dec. 4, 1935
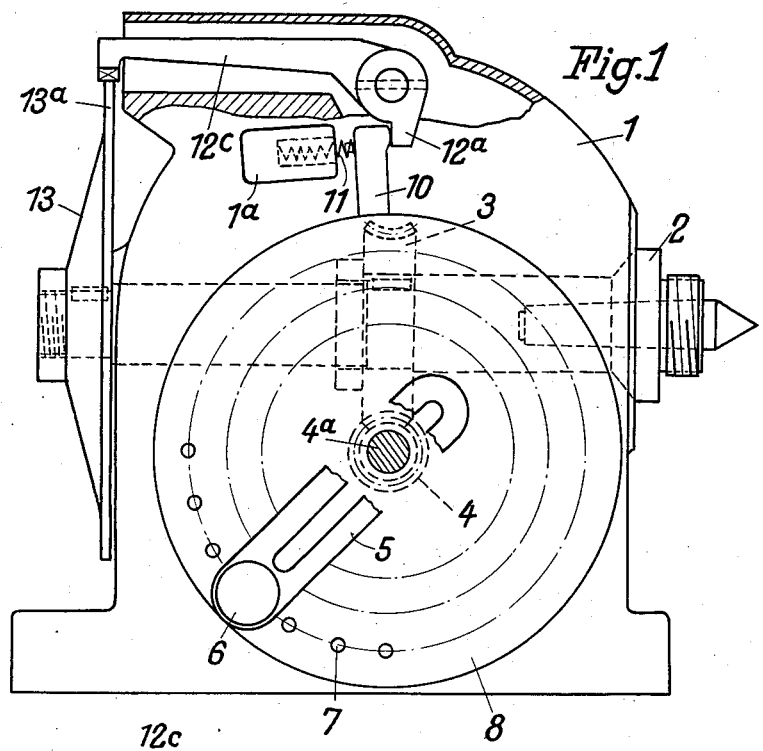
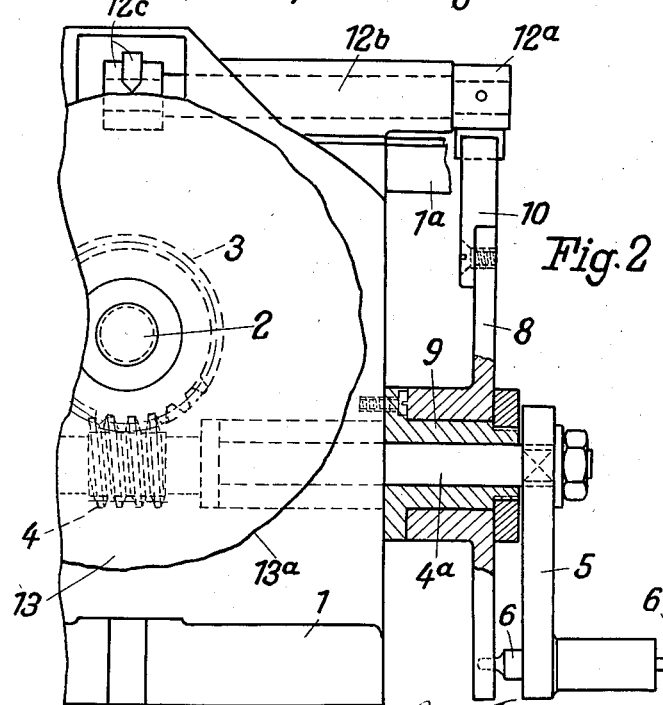
Inventor:
Herbert Lindner.
By Franks. Appleman,
Atty.

Patented Sept. 21, 1937

2,093,917

UNITED STATES PATENT OFFICE 2,093,917

DIVIDING APPARATUS FOR MACHINE TOOLS

Herbert Lindner, Berlin, Germany

Application December 4, 1935, Serial No. 52,926
In Germany January 22, 1935

3 Claims. (Cl. 90—57)

This invention relates to a dividing apparatus for machine tools and the like and of the kind operated by means of a worm wheel mounted on the dividing spindle and a worm mounted on the shaft of the dividing arm. The precision of dividing apparatus of this kind depends on the accuracy with which the teeth of the worm wheel are cut. It also depends on the accuracy of the spacing of the apertures or graduations of the dividing plate. Technical means are at present available whereby the apertures or graduations of a dividing plate can be spaced accurately with very small tolerance. In cutting the teeth of the worm wheel, however, there are difficulties which greatly militate against accuracy. The cutting of screw threads involves similar difficulties, and it has been found necessary, in connection with lathes, to provide means operative to compensate for the irregularity of the pitch of the lead screw. For this purpose it has been proposed to mount the screw in a rotatable nut and to control the angular position of this nut by means of a guide bar adapted to impart to the nut rotary adjusting movements the direction and magnitude of which are determined by the pitch errors of the screw.

The object of the present invention is to compensate, in a similar manner, for the inaccuracies of the worm wheel of a dividing apparatus, and the invention consists essentially in providing the apparatus with a dividing plate which is rotatable relative to its support and controlled, through the medium of suitable motion transmitting elements, by a cam which receives motion from the dividing spindle.

Fig. 1 of the accompanying drawing represents a side view, partly in section, of a dividing apparatus constructed according to the invention, and Fig. 2 is a front view of the apparatus, also partly in section.

The dividing apparatus comprises a casing 1 wherein a dividing spindle 2 is rotatably mounted. A worm wheel 3 seated on said spindle, meshes with a worm 4 mounted on a shaft 4a which is also supported in the casing at right angles to the dividing spindle. One of the bearings 9 for the shaft 4a serves as a support for a dividing plate 8 which is, according to the invention, rotatable about the bearing. The worm shaft 4a is provided with the usual dividing arm 5 carrying a spring pin 6 adapted to snap into apertures 7 in the dividing plate 8 for retaining the dividing spindle in its different positions. The arm 5 is mounted by means of an elongated slot on a squared portion of the shaft 4a, so that it can be radially adjusted in known manner for bringing the spring pin into line with different rows of apertures on the dividing plate.

The dividing plate 8 remains practically stationary and is merely subjected to minor rotary displacements in one direction or the other in order to rectify the angular position of the dividing spindle where it is wrong owing to inaccuracies in the pitch of the worm wheel. For this purpose the dividing plate is controlled by a cam disc 13 which in the illustrated arrangement is mounted on the rear end of the spindle 2 and provided with a circumferential cam face 13a. A rock shaft 12b is provided at one end with a lever 12c which bears against the cam face 13a, and at the other end with a lever 12a adapted to bear against an abutment in the form of an arm 10 secured to the dividing plate 8. A spring 11, which is supported on the casing in a socketed member 1a, bears against the arm 10 and holds it in permanent contact with the lever 12a, the pressure of the spring causing at the same time the lever 12c to be held in permanent contact with the cam face 13a. The shape of the cam face, which moves in unison with the worm wheel, is determined by the irregularities in the pitch of the latter and made so as to compensate for these irregularities, due regard being had to the length and position of the different lever arms.

By this arrangement the usual tolerance of ±0.5 minute of arc in dividing apparatus of this kind, can be reduced to a few seconds.

The cam face may be made so as to act in an axial direction instead of in a radial direction as illustrated. In this case motion may be transmitted from the cam face to the abutment 10 by means of a mere plunger. However, the illustrated arrangement is preferable, since the length of the cam face can be enlarged according to requirements.

Instead of the illustrated perforated dividing plate, a plate provided with graduations can be used in conjunction with a dividing arm provided with an index.

The dividing apparatus can be constructed as a horizontal or vertical dividing head for application to machine tools of various kinds or as a circular table for boring machines.

I claim:

1. In an apparatus of the kind described, a housing, a member rotatably mounted in said housing and provided with means to support an element to be circularly divided, a worm wheel fixed on said member, a worm meshing with said worm wheel, a shaft whereon said worm is mounted, a crank arm for rotating said shaft, a disk mounted on said shaft for concentric movement relative thereto, cooperative means on the arm and disk for regulating the extent of angular movement of the arm over said disk, and means for variably shifting the position of the disk relative to said shaft in accordance with variations in the spacing of the teeth on said worm wheel, said last mentioned means consisting of a cam wheel fixed on said shaft to rotate in unison with the worm wheel and having a cam face contour arranged to compensate errors in the spacing of the worm wheel teeth, and leverage means between the disk and cam wheel engaging said cam face at one end and arranged at its other end to shift the disk rotatively in accordance with the cam face contour.

2. In an apparatus of the kind described, a housing, a member rotatably mounted in said housing and provided with means to support an element to be circularly divided, a worm wheel fixed on said member, a worm meshing with said worm wheel, a shaft whereon said worm is mounted, a crank arm for rotating said shaft, a disk mounted on said shaft for concentric movement relative thereto, cooperative means on the arm and disk for regulating the extent of angular movement of the arm over said disk, means for variably shifting the position of the disk relative to said shaft in accordance with variations in the spacing of the teeth on said worm wheel, said last means consisting of an arm projecting from said disk, a cam rotating with said member, and lever means having one arm riding over said cam and a second arm bearing against the first mentioned arm.

3. In an apparatus of the kind described, a housing, a member rotatably mounted in said housing and provided with means to support an element to be circularly divided, a worm wheel fixed on said member, a worm meshing with said worm wheel, a shaft whereon said worm is mounted, a crank arm for rotating said shaft, a disk mounted on said shaft for concentric movement relative thereto, cooperative means on the arm and disk for regulating the extent of angular movement of the arm over said disk, means for variably shifting the position of the disk relative to said shaft in accordance with variations in the spacing of the teeth on said worm wheel, said last means consisting of an arm projecting from said disk, a cam rotating with said member, lever means having one arm riding over said cam and a second arm bearing against the first mentioned arm, and spring means holding the arm attached to the disk against the second arm of the said lever.

HERBERT LINDNER.